United States Patent
Noel

(10) Patent No.: US 7,614,688 B2
(45) Date of Patent: Nov. 10, 2009

(54) MOTOR VEHICLE FRONT SPOILER WITH DEFORMABLE SEALING BULKHEAD

(75) Inventor: Gilles Noel, Saint Forget (FR)

(73) Assignee: Renault S.A.S., Boulogne Billancourt (FR)

( * ) Notice: Subject to any disclaimer, the term of this patent is extended or adjusted under 35 U.S.C. 154(b) by 0 days.

(21) Appl. No.: 11/995,545

(22) PCT Filed: Jul. 5, 2006

(86) PCT No.: PCT/FR2006/050678

§ 371 (c)(1),
(2), (4) Date: Mar. 3, 2008

(87) PCT Pub. No.: WO2007/006996

PCT Pub. Date: Jan. 18, 2007

(65) Prior Publication Data

US 2008/0217937 A1 Sep. 11, 2008

(30) Foreign Application Priority Data

Jul. 12, 2005 (FR) .................................. 05 07483

(51) Int. Cl.
*B62D 25/16* (2006.01)
(52) U.S. Cl. .............. 296/198; 296/187.04; 296/193.11
(58) Field of Classification Search ............ 296/187.04, 296/187.09, 198; 180/274
See application file for complete search history.

(56) References Cited

U.S. PATENT DOCUMENTS

| | | | |
|---|---|---|---|
| 6,698,820 B2* | 3/2004 | Nakata | 296/193.09 |
| 6,767,052 B2* | 7/2004 | Kubota | 296/203.02 |
| 7,413,239 B2* | 8/2008 | Mitsuyama | 296/187.04 |
| 2002/0063443 A1* | 5/2002 | Lee | 296/198 |
| 2002/0171262 A1* | 11/2002 | Ozawa | 296/189 |
| 2003/0173802 A1* | 9/2003 | Kubota | 296/203.02 |
| 2004/0007901 A1 | 1/2004 | Weik et al. | |
| 2004/0251716 A1* | 12/2004 | Choi et al. | 296/187.03 |
| 2008/0042454 A1* | 2/2008 | Garnweidner | 293/132 |
| 2008/0100073 A1* | 5/2008 | Mitsuyama | 293/132 |

FOREIGN PATENT DOCUMENTS

| | | |
|---|---|---|
| DE | 10063582 | 6/2002 |
| DE | 10233474 | 2/2004 |
| JP | 2001 287669 | 10/2001 |
| JP | 2001-287669 | * 10/2001 |
| JP | 2008-94354 A | * 4/2008 |

OTHER PUBLICATIONS

Machine Translation of JP2001287669.*

* cited by examiner

*Primary Examiner*—Jason S Morrow
(74) *Attorney, Agent, or Firm*—Oblon, Spivak, McClelland, Maier & Neustadt, L.L.P.

(57) ABSTRACT

A motor vehicle deformable front spoiler. The vehicle includes a chassis, the chassis including an outer wall and a deformable sealing bulkhead. The outer wall includes an upper edge extended by an inner edge. The deformable sealing bulkhead links the inner edge and the chassis extending in a curve towards the outer wall. The deformable sealing bulkhead is configured to fold back on itself while being laterally offset towards the outer wall when the front spoiler is dented towards the frame under effect of an impact. The deformable sealing bulkhead includes two substantially parallel side walls curving towards the outer wall, so as to guide laterally the front spoiler when the front spoiler is dented.

14 Claims, 1 Drawing Sheet

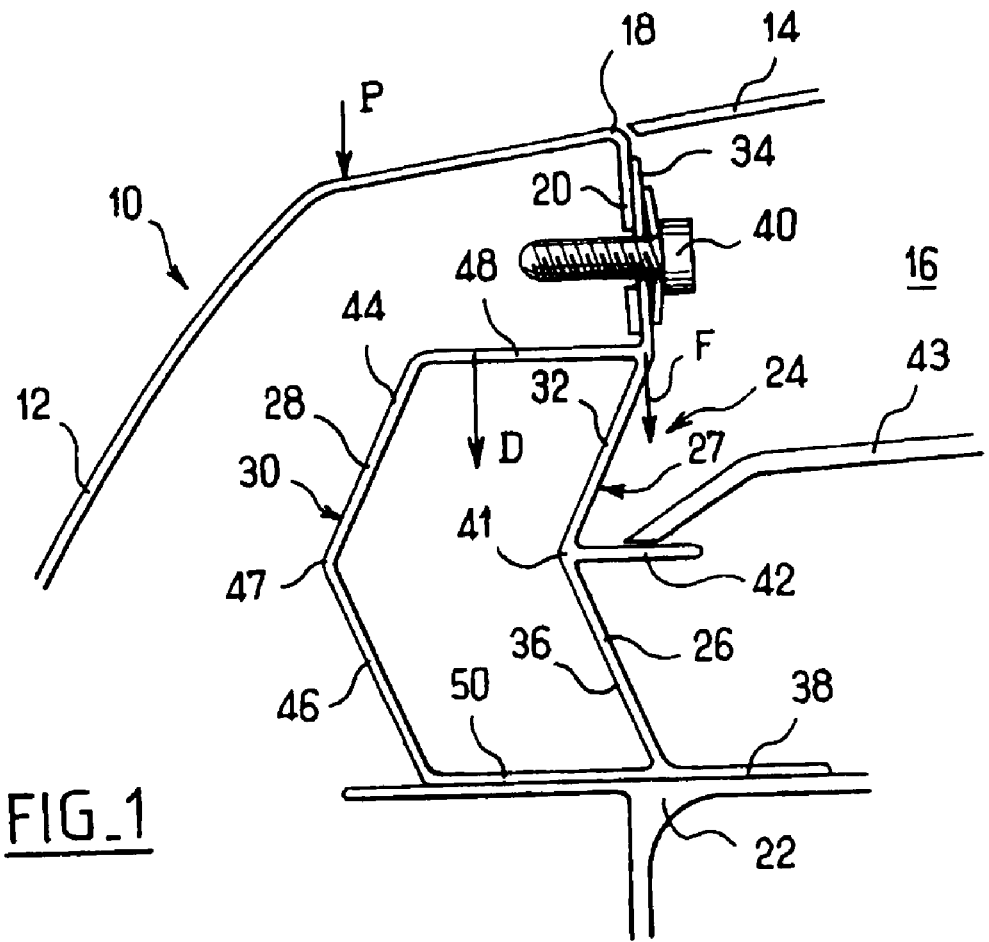
FIG_1
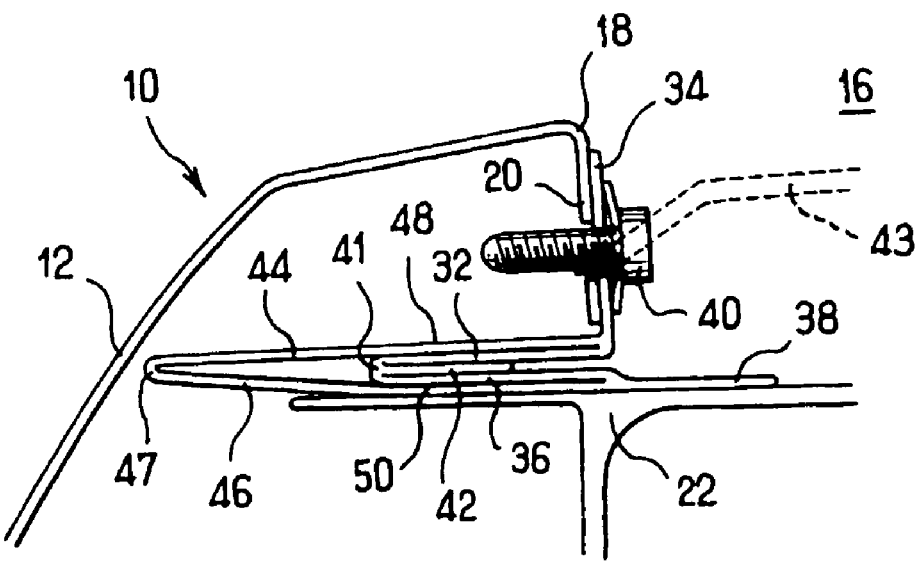
FIG_2

MOTOR VEHICLE FRONT SPOILER WITH DEFORMABLE SEALING BULKHEAD

BACKGROUND OF THE INVENTION

1. Field of the Invention

The present invention relates to a motor-vehicle front fender with a deformable sealed bulkhead.

2. Discussion of the Background

Such a fender is intended in particular to constitute front impact-absorbing means of a vehicle, between a bumper and a windshield, making it possible to absorb the energy in the event of a collision with a pedestrian, in order to limit injuries to the said pedestrian.

Motor vehicles are usually provided with a chassis and a motive power unit installed on the said chassis, and the said motive power unit is covered by a hood. The said fender prolongs the said hood while being laterally parallel to the said motive power unit, and it is braced on a side beam of the chassis. In addition, the fender is provided with an outer wall and a deformable sealed bulkhead, in order to absorb the energy in the case of collision, the said outer wall having an upper rim adapted to border the said hood, the said upper rim being prolonged by an inner flange that extends under the said hood.

The said deformable sealed bulkhead connects the said inner flange and the said chassis by extending in curved manner toward the said outer wall, between the said outer wall and the said motive power unit, in order to protect the latter, especially from upward water splashes caused in particular by the wheels of the vehicle. In addition, this deformable sealed bulkhead is adapted to collapse on itself, shifting laterally toward the said outer wall when the front fender is indented toward the said chassis under the effect of a collision. In this way, the energy absorbed by the fender is transmitted in a manner that collapses the said sealed bulkhead.

Reference can be made in particular to document DE 10233474, which describes such a device for permitting deformation of the fender.

One disadvantage of such a fender equipped with the said deformable sealed bulkhead lies in the trajectory of its movement during deformation. Effectively, this trajectory depends on the angle with which the vehicle strikes the potential pedestrian, and since it is then not controlled, it is difficult to predict the consequences, both for the pedestrian and for the vehicle.

SUMMARY OF THE INVENTION

A problem that then occurs and that the present invention seeks to overcome is to provide a deformable sealed bulkhead that allows the trajectory of the movement of the fender to be better controlled.

With the objective of solving this problem, the present invention proposes a deformable front fender for a motor vehicle, the said vehicle being provided with a chassis and a motive power unit installed on the said chassis, the said motive power unit being covered by a hood, the said fender prolonging the said hood while being laterally parallel to the said motive power unit and being braced on the said chassis, the said fender being provided with an outer wall and a deformable sealed bulkhead to isolate the motive power unit, the said outer wall having an upper rim adapted to border the said hood, the said upper rim being prolonged by an inner flange that extends under the said hood, the said deformable sealed bulkhead connecting the said inner flange and the said chassis while extending in curved manner toward the said outer wall between the said outer wall and the said motive power unit, the said deformable sealed bulkhead being adapted to collapse on itself, shifting laterally toward the said outer wall when the front fender is indented toward the said chassis under the effect of a collision; according to the invention, the said deformable sealed bulkhead has two substantially parallel side walls that are curved toward the said outer wall, in such a way that they guide the said front fender laterally when it is indented.

Thus one characteristic of the invention lies in the implementation of a sealed bulkhead with substantially parallel double walls, thus preventing the sealed bulkhead from pivoting differently relative to the outer wall of the fender and relative to the chassis. In this way, when the front fender is indented toward the chassis, it is guided in translation according to a trajectory determined by virtue of the side walls, which collapse simultaneously and in parallel, thus making it possible to predict the relative position of the different elements of the fender, in order in particular to prevent parts that could cause bruising from emerging. In addition, it allows the position of elements susceptible to being damaged to be predicted.

Advantageously, the said side walls having respectively an upper branch connected to the said inner flange and a lower branch connected to the said chassis, the said side walls are maintained spaced apart from one another by an upper wall and a lower wall, the said upper wall connecting the upper branches and the said lower wall connecting the lower branches in such a way as to form a tubular sealed bulkhead, for example in one piece. In this way, in addition to the fact that construction of the sealed bulkhead is more economic, when the front fender is indented, the upper wall is brought closer to the lower wall, but remaining oriented in substantially the same way relative thereto, while the lateral walls collapse. At first they respectively collapse on themselves, and they flex relative to the lower and upper walls.

According to one particularly advantageous embodiment of the invention, the said upper and lower walls have substantially identical widths and are substantially parallel to one another, thus making it possible to construct a tubular sealed bulkhead symmetric relative to a plane parallel to the upper and lower walls and extending between the two while intersecting the side walls substantially at the center of their concavity, which will be defined in more detail hereinafter. Thus the indentation of the front fender causes regular deformation of the sealed bulkhead and consequently perfect lateral guidance.

In addition, according to a preferred mode of use of the invention, one of the said curved side walls, opposite the said outer wall relative to the other of the said side walls and therefore extending facing the motive power unit, has a concave surface equipped with a bracing rib, itself extended, at the center of the concavity and in parallel manner between the upper and lower walls, and which is adapted to shift laterally. This bracing rib makes it possible to form a support, for example for a grille or a demountable bulkhead, and by shifting during deformation, it permits by the same action the movement of the grille or of the demountable bulkhead.

Preferably the said side walls have a cross section in the form of an inclined vee or forming chevrons, in such a way as to form, with the upper and lower walls, a deformable double parallelogram, making it possible to guide the movement of the fender precisely along a substantially straight trajectory during a collision with a pedestrian.

BRIEF DESCRIPTION OF THE DRAWINGS

Other features and advantages of the invention will become evident upon reading the description provided hereinafter of a particular embodiment of the invention, given by way of indication but not limitation, with reference to the attached drawings, wherein:

FIG. 1 is a schematic view in vertical section of a front fender according to the invention in a first state; and FIG. 2 is a schematic view of the front fender illustrated in FIG. 1 in a second state.

DETAILED DESCRIPTION OF THE PREFERRED EMBODIMENTS

FIG. 1 illustrates, in vertical and transverse section, a motor-vehicle front fender 10 according to the invention. Front fender 10 has an outer wall 12, which extends upward toward a hood 14 of the motor vehicle. Hood 14 covers a motive power unit 16. Outer wall 12 has an upper rim 18 that borders hood 14, upper rim 18 being prolonged by an inner flange 20 that extends substantially vertically underneath hood 14. In addition, the motor vehicle is provided with a chassis on which motive power unit 16 rests and a portion 22 of which, forming a side beam, is evident in FIG. 1.

In addition, a sealed bulkhead 24, made of a metallic material, for example, extends between outer wall 12 and motive power unit 16, from side beam 22 to upper rim 18, in order to protect it against possible splashes from the ground. Sealed bulkhead 24 has two side walls of recumbent vee shape, a first side wall 26, whose concave surface 27 extends facing motive power unit 16, and a second side wall 28, whose convex surface in turn extends facing outer wall 12. First side wall 26 has a first upper branch 32, which is prolonged by an upper free connecting branch 34, and a first lower branch 36, which is extended by a lower free connecting branch 38. First lower branch 36 and first upper branch 32 form an obtuse angle, for example between 100 and 170°, and at a first junction 41 of the two branches corresponding to a center of concavity, there extends a bracing rib 42 projecting from concave surface 27, substantially as a bisector and substantially in horizontal direction. Upper free connecting branch 34, substantially vertical, is directly applied against inner flange 20 and is made integral therewith by way of screw-on means 40, while lower free connecting branch 38, substantially horizontal, is braced on portion 22 of the side beam and oriented toward motive power unit 16.

In addition, bracing rib 42 is adapted to form a support for a grille 43 and/or to maintain a demountable bulkhead, not illustrated.

Second side wall 28 has a second upper branch 44 parallel to first upper branch 32, and a second lower branch 46 parallel to first lower branch 36, and they are joined at a second junction 47. The two upper branches 44, 32 and the two lower branches 46, 36 are respectively joined to one another by an upper wall 48 and a lower wall 50, which extend parallel to one another, lower wall 50 being braced against portion 22 of the side beam, in the prolongation of lower free connecting branch 38. Thus sealed bulkhead 24 can be made from a rectangular tubular part having, in cross section, two opposite widths corresponding respectively to upper wall 48 and lower wall 50, and respectively two opposite lengths corresponding to the two side walls 26, 28; the two lengths then having been collapsed at their middle and in the same direction.

Thus, when a collision with a pedestrian occurs and tends to exert a downward pressure P on outer wall 12 of the fender, the force is transmitted to upper free connecting branch 34, which will then be guided vertically in translation toward portion 22 of the side beam by virtue of deformation of sealed bulkhead 24, which will now be described. Quite obviously, the thickness of the walls, especially at the level of the collapse angles, will determine the intensity of pressure P at which sealed bulkhead 24 will begin to deform.

As soon as this pressure P is attained, a vertical force F is applied to the junction between upper wall 48 and first upper branch 32, in such a way that upper wall 48 tends to be urged toward lower wall 50 along a downwardly oriented vertical direction D. In this way, and at substantially the same time, the first two branches, upper 32 and lower 36, and in parallel the second two branches 44, 46, tend to collapse respectively toward one another as upper wall 48 moves closer to lower wall 50. In addition, the two junctions 41, 47 are urged simultaneously and laterally toward outer wall 12, in such a way that bracing rib 42 is also shifted toward outer wall 12, and that consequently grille 42 is released from the support of bracing rib 42.

In this way, and at the end of movement, the trajectory of front fender 10 having been substantially linear along vertical direction D, and as FIG. 2 shows, on the one hand the first two branches 32, 36 are substantially parallel to one another and trapped between lower wall 50 and upper wall 48, at the level of side beam 22, bracing rib 42 being flattened between the two, and on the other hand the second two branches 44, 46 are also collapsed toward one another.

Thus the impact energy of front fender 10 has been absorbed by the different walls, which have collapsed respectively toward one another at six different angles.

The invention claimed is:

1. A deformable front fender for a motor vehicle, the vehicle including a chassis and a motive power unit installed on the chassis, the motive power unit being covered by a hood, the fender prolonging the hood while being laterally parallel to the motive power unit and being braced on the chassis, the fender comprising:

an outer wall; and a deformable sealed bulkhead to isolate the motive power unit;

the outer wall including an upper rim configured to border the hood, the upper rim being prolonged by an inner flange that extends under the hood;

the deformable sealed bulkhead connecting the inner flange and the chassis while extending in curved manner toward the outer wall between the outer wall and the motive power unit, the deformable sealed bulkhead configured to collapse on itself, shifting laterally toward the outer wall when the front fender is indented toward the chassis under effect of a collision; and wherein the deformable sealed bulkhead includes two substantially parallel side walls that are curved toward the outer wall, such that the side walls guide the front fender laterally when the fender is indented, wherein one of said side walls is prolonged by an upper free branch, said upper free branch being connected to the inner flange.

2. A deformable front fender according to claim 1, wherein the side walls include respectively an upper branch connected to the inner flange and a lower branch connected to the chassis, wherein the side walls are maintained spaced apart from one another by an upper wall and a lower wall, the upper wall connecting the upper branches and the lower wall connecting the lower branches of the side walls.

3. A deformable front fender according to claim 2, wherein the upper and lower walls have substantially identical widths and are substantially parallel to one another.

4. A deformable front fender for a motor vehicle, the vehicle including a chassis and a motive power unit installed on the chassis, the motive power unit being covered by a hood, the fender prolonging the hood while being laterally parallel to the motive power unit and being braced on the chassis, the fender comprising:
- an outer walk; and
- a deformable sealed bulkhead to isolate the motive power unit;
- the outer wall including an upper rim configured to border the hood, the upper rim being prolonged by an inner flange that extends under the hood;
- the deformable sealed bulkhead connecting the inner flange and the chassis while extending in curved manner toward the outer wall between the outer wall and the motive power unit, the deformable sealed bulkhead configured to collapse on itself, shifting laterally toward the outer wall when the front fender is indented toward the chassis under effect of a collision; and
- wherein the deformable sealed bulkhead includes two substantially parallel side walls that are curved toward the outer wall, such that the side walls guide the front fender laterally when the fender is indented,
- wherein one of the curved side walls, opposite the outer wall relative to the other of the side walls, has a concave surface including a bracing rib configured to be shifted laterally.

5. A deformable front fender according to claim 4, wherein the side walls have a vee-shaped cross section.

6. A deformable front fender according to claim 4, wherein the side walls include respectively an upper branch connected to the inner flange and a lower branch connected to the chassis, and wherein said bracing rib extends from said one of the curved side walls from a junction point between said upper and lower branches, said junction point corresponding to a center of concavity of said one of the curved side walls.

7. A deformable front fender according to claim 4, wherein said bracing rib is positioned so as to support a grille when said deformable sealed bulkhead is not deformed and to no longer support said grille after said deformable sealed bulkhead has collapsed and shifted laterally.

8. A deformable front fender according to claim 1, wherein said upper free branch extends vertically toward said inner flange.

9. A deformable front fender according to claim 8, wherein said inner flange extends vertically toward said upper free branch.

10. A deformable front fender according to claim 9, wherein said inner flange and said upper free branch are connected to each other over respective vertical ends.

11. A deformable front fender according to claim 10, wherein said inner flange and said upper free branch are connected to each other via a screw-on device oriented horizontally.

12. A deformable front fender according to claim 1, wherein said one of said side walls that is prolonged by said upper free branch is closest to said motive power unit.

13. A deformable front fender according to claim 12, wherein the other of said side walls does not contact said upper free branch.

14. A deformable front fender according to claim 13, wherein the other of said side walls is connected to said one of said side walls via an upper wall, wherein said upper wall does not contact said inner flange.

* * * * *